: US009557231B2

(12) United States Patent
Villiger et al.

(10) Patent No.: US 9,557,231 B2
(45) Date of Patent: Jan. 31, 2017

(54) SENSING CABLE

(75) Inventors: Brett Villiger, Simpsonville, SC (US);
Craig Stratton, Spartanburg, SC (US);
Joe Cignarale, Greer, SC (US); Brian Herbst, Easley, SC (US); Yoshio Hashimoto, Duncan, SC (US);
Matsuhiro Miyamoto, Greenville, SC (US)

(73) Assignee: AFL TELECOMMUNICATIONS LLC, Duncan, SC (US)

( * ) Notice: Subject to any disclaimer, the term of this patent is extended or adjusted under 35 U.S.C. 154(b) by 36 days.

(21) Appl. No.: 13/877,018

(22) PCT Filed: Sep. 30, 2011

(86) PCT No.: PCT/US2011/054251
§ 371 (c)(1),
(2), (4) Date: Nov. 15, 2013

(87) PCT Pub. No.: WO2012/044947
PCT Pub. Date: Apr. 5, 2012

(65) Prior Publication Data
US 2014/0056553 A1    Feb. 27, 2014

Related U.S. Application Data

(60) Provisional application No. 61/388,749, filed on Oct. 1, 2010, provisional application No. 61/425,955, filed
(Continued)

(51) Int. Cl.
*G01L 1/24*    (2006.01)
*G02B 6/44*    (2006.01)
(Continued)

(52) U.S. Cl.
CPC .............. *G01L 1/242* (2013.01); *G01K 1/14*
(2013.01); *G01K 11/32* (2013.01); *G01L 11/025* (2013.01); *G02B 6/443* (2013.01);
*G02B 6/4407* (2013.01)

(58) Field of Classification Search
CPC ..... G02B 6/4415; G02B 6/443; G02B 6/4416;
G02B 6/4407; G01K 11/32; G01K 1/14;
E21B 47/011; E21B 47/123; E21B 47/06;
G01L 1/242; G01L 11/025; G01D 5/35374
(Continued)

(56) References Cited

U.S. PATENT DOCUMENTS 4,920,261 A * 4/1990 Bock .................. G01L 11/025
250/225
5,355,425 A * 10/1994 Braiman .............. G01N 21/552
385/12

(Continued)

FOREIGN PATENT DOCUMENTS

JP    10-289778 A    10/1998
JP    10289778 A * 10/1998 .............. H05B 3/10

*Primary Examiner* — Peter Radkowski
(74) *Attorney, Agent, or Firm* — Dority & Manning, P.A.

(57)    ABSTRACT

A sensing cable is provided which includes exposed and/or unexposed optical fibers or wires disposed through the length of the sensing cable. The sensing cable includes a slotted core which is a one-piece integral member having a plurality of channels formed on a perimeter of the slotted core and which extend along a length of the slotted core. The sensing cable includes at least one exposed component which is disposed in a first channel of the plurality of channels and which extends along a length of the first channel. The sensing cable includes at least one unexposed component which is encased by a protective member, and the unexposed component and the protective member are disposed in a second channel of the plurality of channels. The unexposed component and the protective member extend along a length of the second channel.

28 Claims, 4 Drawing Sheets

Related U.S. Application Data on Dec. 22, 2010, provisional application No. 61/434,904, filed on Jan. 21, 2011.

(51) Int. Cl.
  G01L 11/02 (2006.01)
  G01K 1/14 (2006.01)
  G01K 11/32 (2006.01)

(58) Field of Classification Search
  USPC .................................... 385/12, 13; 356/73.1
  See application file for complete search history.

(56) References Cited

U.S. PATENT DOCUMENTS

| | | | |
|---|---|---|---|
| 6,160,940 A * | 12/2000 | Summers et al. | 385/110 |
| 6,317,540 B1 * | 11/2001 | Foulger et al. | 385/100 |
| 6,424,772 B1 * | 7/2002 | Blazer et al. | 385/110 |
| 6,777,947 B2 * | 8/2004 | McCoy et al. | 324/449 |
| 7,009,113 B2 * | 3/2006 | Varkey | 174/102 R |
| 7,017,417 B2 * | 3/2006 | Daigle | E21B 47/011 73/705 |
| 7,322,247 B2 * | 1/2008 | Boyd | G01L 23/16 73/729.1 |
| 7,755,027 B2 * | 7/2010 | Browning et al. | 250/227.14 |
| 2004/0264831 A1 * | 12/2004 | Leppert | 385/12 |
| 2005/0077455 A1 * | 4/2005 | Townley-Smith et al. | 250/227.27 |
| 2005/0172721 A1 * | 8/2005 | Daigle | E21B 47/011 73/705 |
| 2006/0005628 A1 * | 1/2006 | Boyd | G01L 23/16 73/729.1 |
| 2008/0137711 A1 * | 6/2008 | Gleitman | E21B 47/06 374/161 |
| 2011/0311179 A1 * | 12/2011 | Greenaway | E21B 47/123 385/12 |

* cited by examiner

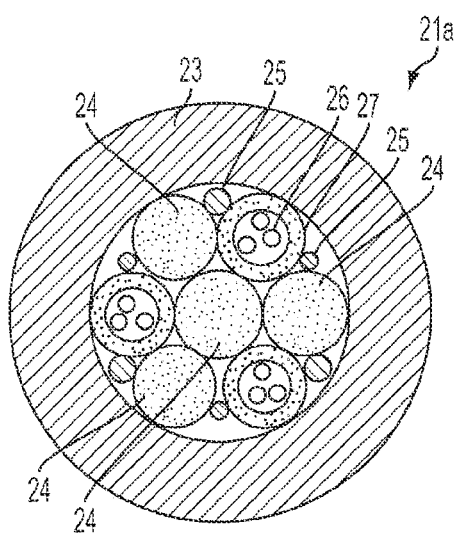
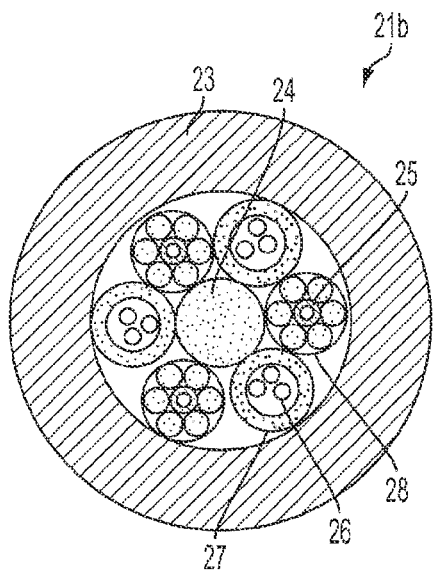
FIG. 2A  FIG. 2B
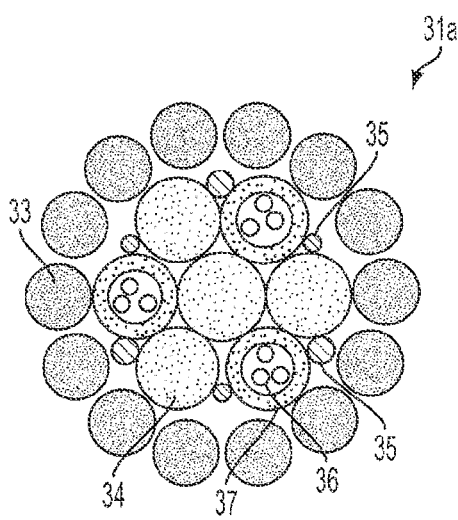
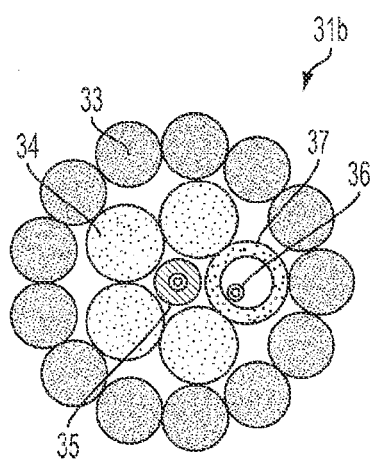
FIG. 3A  FIG. 3B

SENSING CABLE

CROSS-REFERENCE TO RELATED APPLICATIONS

This application claims priority from U.S. Provisional Application No. 61/388,749, filed on Oct. 1, 2010, U.S. Provisional Application No. 61/425,955, filed on Dec. 22, 2010, and U.S. Provisional Application No. 61/434,904, filed on Jan. 21, 2011, the disclosures of which are incorporated herein by reference in their entirety.

BACKGROUND

1. Field

The present invention generally relates to sensing cables, and more particularly, to sensing cables which detect external pressure and strain.

2. Description of the Related Art

In recent years optical fibers have been used for sensing the distribution of temperature in oil and gas downhole and logging cables. Temperature sensing using distributed temperature sensing with optical fiber is a well mown technology. Generally in this system, a cable containing an optical fiber encased in a stainless steel tube (SST) is used. In this cable structure, the optical fiber is protected by the SST from external pressures and strain. Using optical fibers for measuring external pressure and strain is desired by the oil and gas industry for both downhole and logging applications. Brillouin Optical Time Domain Reflectometry (BOTDR) analyzing systems for sensing temperature and pressure distribution at the same time is under development. However, detecting external pressure and strain are both extremely difficult due to inaccuracies and dependability of the cable structure and/or fiber.

This disclosure illustrates new cable designs that address these concerns, but the invention is not limited to these specific applications, nor is the invention required to address any of these concerns.

SUMMARY

Exemplary embodiments of the general inventive concept invention may overcome the above disadvantages as well as other disadvantages not described above.

According to an exemplary embodiment, there is provided a sensing cable including a slotted core which is a one-piece integral member and has a plurality of channels formed on a perimeter of the slotted core. The plurality of channels extend along a length of the slotted core.

The plurality of channels may extend along the length of the slotted core in an arrangement parallel to a longitudinal axis of the slotted core, or may extend along the length of the slotted core in a helical arrangement.

The sensing cable may further include a protective layer which surrounds the slotted core.

The sensing cable may include an exposed component which is disposed in a first channel of the plurality of channels, and which extends along a length of the first channel.

The sensing cable may include an unexposed component which is encased by a protective member, and the unexposed component and the protective member are disposed in a second channel of the plurality of channels, and the unexposed component and the protective member extend along a length of the second channel.

The exposed component is selected from one of a first optical fiber and a first wire, and the unexposed component is selected from one of a second optical fiber and a second wire.

Furthermore, the exposed component may be disposed entirely within the first channel and does not extend beyond the perimeter of the slotted core. Similarly, the unexposed component and the protective member may be disposed entirely within the second channel and do not extend beyond the perimeter of the slotted core.

According to another exemplary embodiment, there is provided a sensing cable including a stranded wire core comprising a plurality of wires coupled together, a protective layer which encases the stranded wire core, a protective member disposed in a first space formed between the stranded wire core and the protective layer, an unexposed component encased within the protective member, and an exposed component disposed in a second space formed within the protective layer.

The second space may be formed between the stranded wire core and the protective layer.

The second space may be formed by an area enclosed by the plurality of wires and the protective member.

Furthermore, the plurality of wires may include a single-strand wire and a multi-strand wire, and the second space may be formed in an area enclosed by strands of the multi-strand wire.

The plurality of wires of the stranded wire core may have a helical arrangement.

The exposed component is selected from one of a first optical fiber and a first wire which extend along a length of the cable, and the unexposed component is selected from one of a second optical fiber and a second wire which extend along the length of the cable.

According to another exemplary embodiment, there is provided a sensing cable including a cable core structure. The cable core structure includes an unexposed component, a first protective member which encases the unexposed component, an exposed component, and a second protective member which encases the exposed component. Additionally, the second protective member has a plurality of holes formed therethrough at intermittent locations provided along a length of the second protective member.

The exposed component is selected from one of a first optical fiber and a first wire which extend along a length of the cable, and the unexposed component is selected from one of a second optical fiber and a second wire which extend along the length of the cable.

The unexposed component may measure a distribution of temperature, and the exposed component may measure a distribution of pressure.

The first protective member and the second protective member may be protective tubes.

The first protective member and the second protective member may be stranded together.

Alternatively, the second protective member may be stranded around a central part of the first protective member.

Alternatively, the first protective member may be stranded around a central part of the second protective member.

The sensing cable may also include a central strength member disposed along the length of the cable, and the cable core structure may be stranded around a central part of the central strength member.

The sensing cable may further include a protective layer which surrounds the cable core structure. For example, the sensing cable may include a protective tube structure or a plurality of wires which surround the cable core structure.

The holes may have a diameter from 0.1 mm to 3.0 mm, and may be spaced apart from each other by a distance of 10 mm to 10,000 mm. This holes may also be formed as slits.

BRIEF DESCRIPTION OF THE DRAWINGS

The above and other aspects of the present invention will become more apparent from the following description of exemplary embodiments, taken in conjunction with the accompanying drawings of which:

FIG. 2A illustrates a sensing cable having a stranded wire core according to an exemplary embodiment;

FIG. 2B illustrates a sensing cable having a stranded wire core according to another exemplary embodiment;

FIG. 3A illustrates a sensing cable having a stranded wire core according to another exemplary embodiment;

FIG. 3B illustrates a sensing cable having a stranded wire core according to another exemplary embodiment;

Throughout the drawings, the same drawing reference numerals will be understood to refer to the same elements, features, and structures.

DETAILED DESCRIPTION OF THE EXEMPLARY EMBODIMENTS

Figure 1A:
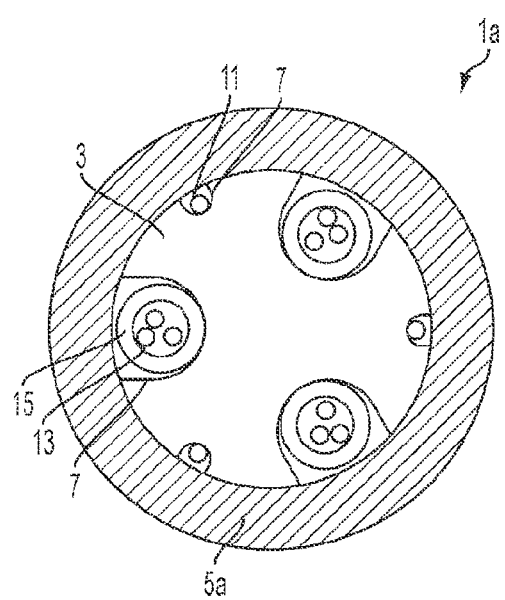
FIG. 1A illustrates a sensing cable having a slotted core according to an exemplary embodiment.

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the general inventive concept. Also, descriptions of well-known functions and constructions are omitted for clarity and conciseness. In the following description, like drawing reference numerals are used for the like elements, even in different drawings.

Figure 1B:
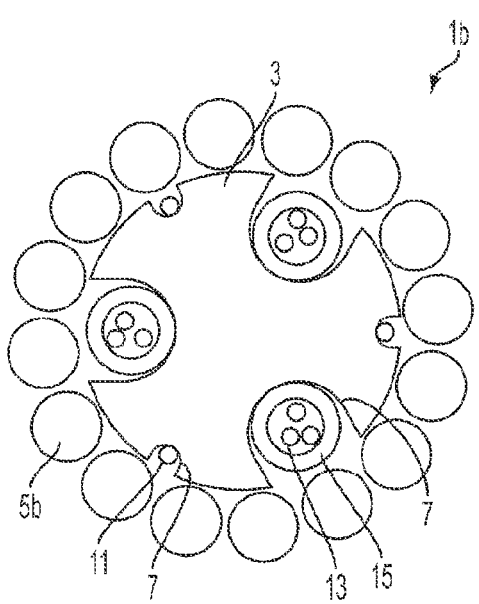
FIG. 1B illustrates a sensing cable having a slotted core according to another exemplary embodiment.

FIGS. 1A and 1B illustrate exemplary embodiments of a sensing cable 1 (1a and 1b) having a slotted core 3 encased by a protective layer 5 (5a and 5b).

The protective layer 5 may be a protective tube (e.g., a pipe) shown in FIG. 1A, a plurality of protective wires shown in FIG. 1B (e.g. stranded wire cable design), or equivalent protective member. The protective tube shown in FIG. 1A may be made of any ferrous or non-ferrous metals, or any type of plastic, PVC, PE, PFA, PVDF, TEFZEL, MFA, TEFLON, PTFE, PBT, PP, etc. Similarly, the plurality of protective wires shown in FIG. 1B may be made of any ferrous or non-ferrous metals, or any type of plastic, PVC, PE, PFA, PVDF, TEFZEL, MFA, TEFLON, PTFE, PBT, PP, etc.

Furthermore, the sensing cable 1 may include more than one protective layer in addition to protective layer 5, which may be of the same or different type of material. In this case, the additional protective layer/s would encase protective layer 5, or would be encased by protective layer 5. The protective layers 5 (protective tube or protective wires), including any additional protective layers, may be of any shape, thickness, diameter or dimension, and may be made up of any material listed above or equivalents.

The slotted core 3 is a one-piece integral member which includes a plurality of channels 7 on its perimeter which are recesses or cavities formed on the core's perimeter that extend along the entire length of the slotted core 3 (i.e., through the length of the cable). While the slotted core 3 is shown to be circular, the slotted core 3 may be any shape. The slotted core 3 may be made up of any ferrous or non-ferrous metals, or any type of plastic, PVC, PE, PFA, PVDF, TEFZEL, MFA, TEFLON, PTFE, PBT, PP, etc.

The sensing cable structures in FIGS. 1A and 1B contain two types of components (unexposed and exposed). For example, the plurality of channels 7 include at least one channel which is configured to have an exposed component 11 disposed therein, and the plurality of channels 7 include at least one channel which is configured to have an unexposed component 13 disposed therein.

The exposed component 11 disposed entirely within one of the channels 7 such that the exposed component 11 does not extend beyond the perimeter of the slotted core 3. The exposed component may be coupled directly to the slotted core 3 inside the corresponding channel 7.

The unexposed component 13 is disposed within a protective member 15 such that the unexposed component 13 is surrounded and protected by the protective member 15. Accordingly, the protective member 15 is also disposed entirely within one of the channels 7 corresponding to the unexposed component 13. That is, the protective member 15 does not extend beyond the perimeter of the slotted core 3.

The protective layer 5 confines the exposed components 11, the unexposed components 13 and the protective members 15 in their respective channels 7.

The plurality of channels 7 may extend along the length of the slotted core 3, parallel to the longitudinal axis of the core 7/cable 1, or the plurality of channels 7 may extend along the length of the slotted core 3 in a helical pattern. A helical pattern allows for an increased strain window in components, allows for omnidirectional strain sensing, and improves coupling of components to the slotted core 3.

The channels 7 which contain the exposed components 11 may be smaller than the channels 7 which contain the unexposed components 13. Furthermore, the channel types (i.e., exposed and unexposed) may alternate around the perimeter of the slotted core 3.

The exposed components 11 are exposed by some method to allow for external pressures or strain, and may be used for sensing, communication, and/or power transmission. The exposed components 11 have increased exposure allowing for quicker response to temperature, strain, pressure, acoustics, etc.

The exposed components 11 may be any one of a bare optical fiber, a colored optical fiber, a coated optical fiber, or a buffered optical fiber (e.g., any type of plastic, PVC, PE, PFA, PVDF, TEFZEL, MFA, TEFLON, PTFE, PBT, PP, etc.). Alternatively, the exposed components 11 may be any copper wire having the same options listed above for the optical fibers.

The unexposed components 13 are unexposed by some method to allow for external pressures or strain, and may be used for sensing, communication, and/or power transmission.

The unexposed components 13 may be any one of a bare optical fiber, a colored optical fiber, a coated optical fiber, or a buffered optical fiber (e.g., any type of plastic, PVC, PE, PFA, PVDF, TEFZEL, MFA, TEFLON, PTFE, PBT, PP, etc.). Alternatively, the unexposed components 13 may be any copper wire having the same options listed above for the optical fibers.

The protective members 15, which encase the unexposed components 13, may be a buffer tube made out of any type of plastic, PVC, PE, PFA, PVDF, TEFZEL, MFA, TEFLON, PTFE, PET, PP, etc., or a metal tube made out of any type of ferrous or non-ferrous metal.

While the exemplary embodiments show channels 7 for both exposed and unexposed components, the slotted core 3 may be provided with only exposed components 11 in the channels 7, or with only unexposed components 13 in the channels 7.

The sensing cable 1 may be used as oil well cables, downhole cables, data logging cables, and the like. According to the structural configuration of the sensing cable 1, exposed and unexposed components are protected from mechanical stresses (i.e., crush, impact, etc.) while still allowing for sensing of temperature, strain, pressure, acoustics, etc.

The exposed and unexposed components may be coupled to the slotted core 3 to represent cable strain.

The design of the sensing cable 1 may allow for low hysteresis.

The design of the sensing cable 1 can allow for high temperature range.

The design of the sensing cable 1 can reduce creep and core slippage within cable.

FIGS. 2A and 2B illustrate exemplary embodiments of a sensing cable 21 (21a and 21b) having a stranded wire core encased by a protective layer 23.

FIG. 2A shows a stranded wire core composed of a plurality of single-strand wires 24 which are in abutting contact with each other. Exposed components 25 and unexposed components 26 are disposed in spaces formed between the wires 24. The unexposed components 26 are disposed within a protective member 27 such that the unexposed components 26 are surrounded and protected by the protective member 27. The protective member 27, itself, is disposed in a space formed between the wires 24 and the protective layer 23, and contains the unexposed components 26 therein. The exposed components 25 are disposed in spaces formed between the wires 24, the protective member 27 and the protective layer 23.

FIG. 2B shows sensing cable 21b that has a stranded core composed of a single-strand wire 24 and a plurality of multi-strand wires 28. An exposed component 25 is disposed in a center of the multi-strand wire 28 such that the wires of the multi-strand wire 28 surround the exposed component 25. Additionally, unexposed components 26 are disposed within protective members 27. The protective members 27 are disposed in spaces formed between the single-strand wire 24, the multi-strand wires 28 and the protective layer 23.

The protective layer 23 may be a pipe, or an equivalent protective member. The protective layer 23 shown in FIGS. 2A and 2B may be made of any ferrous or non-ferrous metals, or any type of plastic, PVC, PE, PFA, PVDF, TEFZEL, MFA, TEFLON, PTFE, PBT, PP, etc. Similarly, the single-strand wires 24, the multi-strand wires 28 and the protective members 27 may be made of any ferrous or non-ferrous metals, or any type of plastic, PVC, PE, PFA, PVDF, TEFZEL, MFA, TEFLON, PTFE, PBT, PP, etc.

Furthermore, the sensing cable 21 may include more than one protective layer in addition to protective layer 23 as similarly described above for FIGS. 1A and 1B. The protective layers 23, including any additional protective layers, may be of any shape, thickness, diameter or dimension, and may be made up of any material listed above or equivalents.

The exposed components 25 are exposed by some method to allow for external pressures or strain, and may be used for sensing, communication, and/or power transmission. The exposed components 25 have increased exposure allowing for quicker response to temperature, strain, pressure, acoustics, etc.

The exposed components 25 may be any one of a bare optical fiber, a colored optical fiber, a coated optical fiber, or a buffered optical fiber (e.g., any type of plastic, PVC, PE, PFA, PVDF, TEFZEL, MFA, TEFLON, PTFE, PBT, PP, etc.). Alternatively, the exposed components 25 may be any copper wire having the same options listed above for the optical fibers.

The unexposed components 26 are unexposed by some method to allow for external pressures or strain, and may be used for sensing, communication, and/or power transmission.

The unexposed components 26 may be any one of a bare optical fiber, a colored optical fiber, a coated optical fiber, or a buffered optical fiber (e.g., any type of plastic, PVC, PE, PFA, PVDF, TEFZEL, MFA, TEFLON, PTFE, PBT, PP, etc.). Alternatively, the unexposed components 26 may be any copper wire having the same options listed above for the optical fibers.

White the exemplary embodiments provide both exposed and unexposed components, the stranded wire core may be provided with only exposed components 25, or with only unexposed components 26.

The sensing cable 21 may be used as oil well cables, downhole cables, data logging cables, and the like. According to the structural configuration of the sensing cable 21, exposed and unexposed components are protected from mechanical stresses (i.e., crush, impact, etc.) while still allowing for sensing of temperature, strain, pressure, acoustics, etc.

The exposed and unexposed components may be coupled to the stranded wire core to represent cable strain.

The design of the sensing cable 21 may allow for low hysteresis.

The design of the sensing cable 21 can allow for high temperature range.

The design of the sensing cable 21 can reduce creep and core slippage within cable.

The stranded wire core can be helixed to allow for increased strain window in components, allow omnidirectional strain sensing and improve coupling of components FIGS. 3A and 3B illustrate additional exemplary embodiments of a sensing cable 31 (31a and 31b) having a stranded wire core encased by a protective layer 33.

The sensing cables 31a and 31b include single-strand wires 34, which make up the stranded wire core, and are similar to the single-strand wires 24 described above for FIGS. 2A and 2B. Additionally, the sensing cables 31a and 31b include exposed components 35, unexposed components 36 and protective members 37, which are similar to exposed components 25, unexposed components 26 and protective members 27 described above for FIGS. 2A and 2B.

The protective layer 33 is made up of a plurality of protective wires, or equivalent protective member. The plurality of protective wires shown in may be made of any ferrous or non-ferrous metals, or any type of plastic, PVC, PE, PFA, PVDF, TEFZEL, MFA, TEFLON, PTFE, PBT, PP, etc.

The stranded wire core can be helixed to allow for increased strain window in components, allow omnidirectional strain sensing and improve coupling of components.

In FIG. 3B, there is a small gap between each of the wires 34 and the exposed component 35. This gap will protect the exposed component 35 from the external stress. Thus, the wires 34 provide an armor for protecting the exposed component 35 from external stress, but allows the exposed component 35 to feel (i.e., sense) the pressure.

Figure 4:
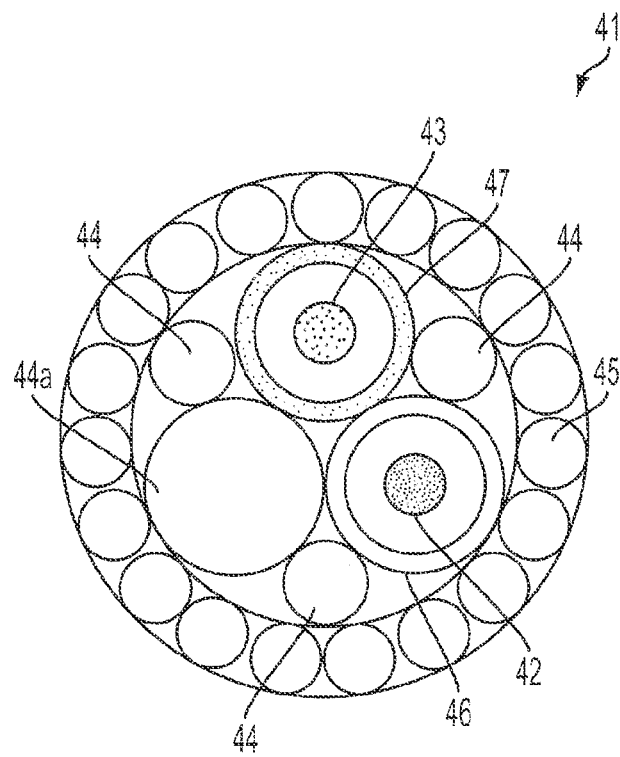
FIG. 4 illustrates a sensing cable having core with a holed protective member according to an exemplary embodiment.

FIG. 4 illustrates exemplary embodiments of a sensing cable 41 having a core which contains an unexposed component 42 and an exposed component 43. In addition to the unexposed and exposed components 42 and 43, the cable 41 includes a plurality of wires 44 which are surrounded by a protective layer 45. The protective layer 45 may include a plurality of protective wires (as shown in FIG. 4), a protective tube (e.g., a pipe) similar to that shown in FIG. 1A, or equivalent protective member, and may be made of any ferrous or non-ferrous metals, or any type of plastic, PVC, PE, PFA, PVDF, TEFZEL, MFA, TEFLON, PTFE, PBT, PP, etc.

Furthermore, the sensing cable 41 may include more than one protective layer in addition to protective layer 45 as similarly described above for FIGS. 1A and 1B. The protective layers 45, including any additional protective layers, may be of any shape, thickness, diameter or dimension, and may be made up of any material listed above or equivalents.

The unexposed component 42 may be any one of a bare optical fiber, a colored optical fiber, a coated optical fiber, or a buffered optical fiber (e.g., any type of plastic, PVC, PE, PFA, PVDF, TEFZEL, MFA, TEFLON, PTFE, PBT, PP, etc.). Alternatively, the unexposed component 42 may be any copper wire having the same options listed above for the optical fibers.

The exposed component 43 may be any one of a bare optical fiber, a colored optical fiber, a coated optical fiber, or a buffered optical fiber (e.g., any type of plastic, PVC, PE, PFA, PVDF, TEFZEL, MEA, TEFLON, PTFE, PBT, PP, etc.). Alternatively, the exposed component 43 may be any copper wire having the same options listed above for the optical fibers.

One or more of the plurality of wires 44 may be a central strength member 44a which provides structure and strength to the cable 41.

The unexposed component 42 is enclosed within a first protective member 46 (e.g., a stainless steel tube).

Figure 5:
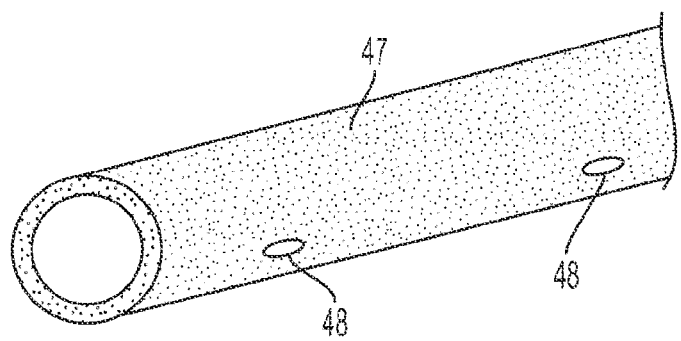
FIG. 5 illustrates a holed protective member according to the exemplary embodiment of FIG. 4.

The exposed component 43 is enclosed within a second protective member 47 (e.g., a holed stainless steel tube). The second protective member 47 has holes 48 formed therethrough at intermittent locations along its length, orthogonal to its longitudinal axis (see FIG. 5). The second protective member 47 (holed protective member) protects the exposed component 43 from external stress, but allows the exposed component 43 to feel (i.e., sense) the pressure. Thus, the second protective member 47 increases the exposure to the exposed component 43, which allows for a quicker response to the pressure.

The unexposed component 42 may measure a distribution of temperature, and the exposed component 43 may measure a distribution of pressure.

The holes 48 may be in a variety of shapes, including slits. The holes 48 may have a diameter from 0.1 mm to 3.0 mm. Additionally, the holes 48 may be spaced apart from each other by a distance of 10 mm to 10,000 mm.

When the cable 41 is disposed at deep sea, for example, the holed protective member 47 can protect the exposed component 43 from external stress mentioned above. In addition, the exposed component 43 can feel the water pressure at the sea depth, because the water penetrates into the holed protective member 47 through the holes 48.

The protective member 46 and the holed protective member 47 may be stranded together, the holed protective member 47 may be stranded around a central part of the protective member 46, the protective member 46 may be stranded around a central part of the holed protective member 47, or the protective member 46 and the holed protective member 47 may be stranded around a central part of the central strength member 44a.

The holed protective member 47 may be formed by forming holes 48 through a plate, and intermittently welding opposite ends of the plate together to form tube-like structure.

Figure 6:
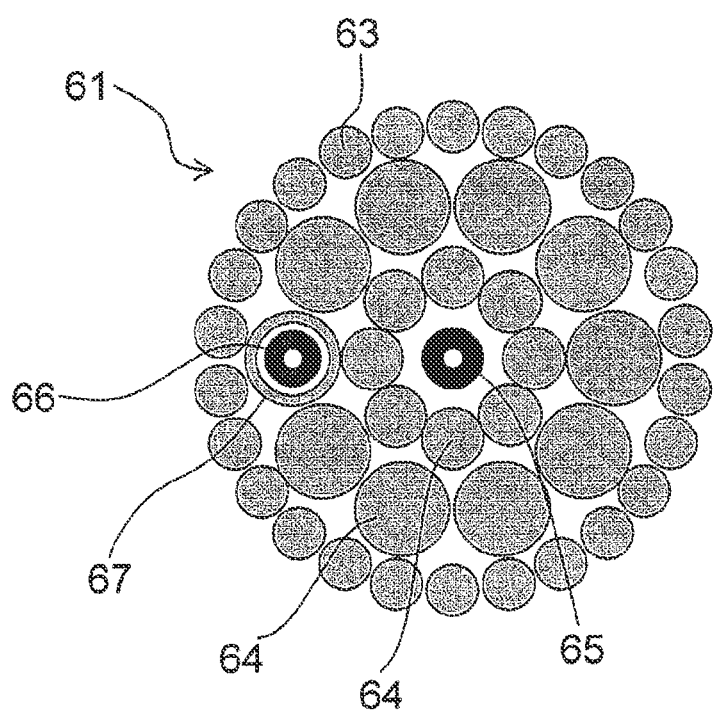
FIG. 6 illustrates a sensing cable having a stranded wire core according to another exemplary embodiment.

FIG. 6 illustrates an exemplary embodiment of a sensing cable 61 having a stranded wire core and is similar to the sensing cable 31b shown in FIG. 3B.

The sensing cable 61 includes a protective layer 63 and a plurality of single-strand wires 64, which make up the stranded wire core, and are similar to the single-strand wires 24 described above for FIGS. 2A and 2B. Additionally, the sensing cable 61 includes an exposed component 65, an unexposed component 66 and a protective member 67, which, are similar to exposed components 25, unexposed components 26 and protective members 27 described above for FIGS. 2A and 2B.

There exists a small gap between each of the wires 64 in the inner-most layer of the core and the exposed component 65. This gap between the wires 64 and the exposed component 65 will protect the exposed component 65 from the external stress. Thus, the wires 64 provide an armor for protecting the exposed component 65 from external stress, but allows the exposed component 65 to feel (i.e., sense) the pressure.

The protective layer 63 is made up of a plurality of protective wires, or equivalent protective member. The plurality of protective wires shown in may be made of any ferrous or non-ferrous metals, or any type of plastic, PVC, PE, PFA, PVDF, TEFZEL, MFA, TEFLON, PTFE, PBT, PP, etc.

The stranded wire core can be helixed to allow for increased strain window in components, allow omnidirectional strain sensing and improve coupling of components.

What is claimed is:

1. A sensing cable comprising:
    a slotted core which is a one-piece integral member comprising a plurality of channels formed on a perimeter of the slotted core, wherein the plurality of channels extend along a length of the slotted core;
    an exposed component which is disposed in a first channel of the plurality of channels, wherein the exposed component extends along a length of the first channel, wherein the exposed component is an optical fiber and is configured to directly contact a fluid surrounding the slotted core and sense temperature and pressure; and
    an unexposed component which is encased by a protective member, and the unexposed component and the protective member are disposed in a second channel of the plurality of channels, wherein the unexposed component and the protective member extend along a length of the second channel, wherein the unexposed component is an optical fiber and is configured to sense temperature.

2. The sensing cable of claim 1, wherein the plurality of channels extend along the length of the slotted core in an arrangement parallel to a longitudinal axis of the slotted core.

3. The sensing cable of claim 1, wherein the plurality of channels extend along the length of the slotted core in a helical arrangement.

4. The sensing cable of claim 1, further comprising a protective layer which encases the slotted core.

5. The sensing cable of claim 1, wherein the exposed component is disposed entirely within the first channel and does not extend beyond the perimeter of the slotted core.

6. The sensing cable of claim 1, wherein the unexposed component and the protective member are disposed entirely within the second channel and do not extend beyond the perimeter of the slotted core.

7. A sensing cable comprising:
a stranded wire core comprising a plurality of wires coupled together;
a protective layer which encases the stranded wire core;
a protective member disposed in a first space formed between the stranded wire core and the protective layer;
an unexposed component encased within the protective member, wherein the unexposed component is an optical fiber is configured to sense temperature; and
an exposed component disposed in a second space formed within the protective layer, wherein the exposed component is an optical fiber and is configured to directly contact a fluid surrounding the stranded wire core and sense temperature and pressure.

8. The sensing cable of claim 7, wherein the second space is formed between the stranded wire core and the protective layer.

9. The sensing cable of claim 7, wherein the second space is formed by an area enclosed by the plurality of wires and the protective member.

10. The sensing cable of claim 7, wherein the second space is formed in a center area enclosed by the plurality of wires, and a gap is provided around an entire perimeter of the exposed component between the plurality of wires and the exposed component.

11. The sensing cable of claim 7, wherein the plurality of wires comprise a single-strand wire and a multi-strand wire, and the second space is formed in an area enclosed by strands of the multi-strand wire.

12. The sensing cable of claim 7, wherein the plurality of wires of the stranded wire core have a helical arrangement.

13. A sensing cable comprising:
a cable core structure comprising:
an unexposed component, wherein the unexposed component is an optical fiber and is configured to sense temperature;
a first protective member which encases the unexposed component;
an exposed component; and
a second protective member which encases the exposed component, wherein the second protective member has a plurality of holes formed therethrough at intermittent locations provided along a length of the second protective member, wherein
the exposed component is an optical fiber and is configured to directly contact a fluid surrounding the slotted core and sense temperature and pressure.

14. The sensing cable of claim 13, wherein the unexposed component measures a distribution of temperature, and the exposed component measures a distribution of pressure.

15. The sensing cable of claim 13, wherein the first protective member and the second protective member are stranded together.

16. The sensing cable of claim 13, wherein the second protective member is stranded around a central part of the first protective member.

17. The sensing cable of claim 13, wherein the first protective member is stranded around a central part of the second protective member.

18. The sensing cable of claim 13, further comprising a central strength member, and wherein the cable core structure stranded around a central part of the central strength member.

19. The sensing cable of claim 13, further comprising a plurality of wires which surround the cable core structure.

20. The sensing cable of claim 13, wherein the holes have a diameter from 0.1 mm to 3.0 mm.

21. The sensing cable of claim 13, wherein the holes are spaced apart from each other by a distance of 10 mm to 10,000 mm.

22. The sensing cable of claim 13, wherein the holes are formed as slits.

23. The sensing cable of claim 1, wherein the core member consists of a single component throughout the core member.

24. The sensing cable of claim 13, wherein the second protective member directly encases an outer circumference of the second protective member.

25. The sensing cable of claim 10, wherein the gap is provided around the entire perimeter of the exposed component between the plurality of wires and the exposed component such that the fluids surrounding the sensing cable permeate the gap.

26. The sensing cable of claim 1, wherein the unexposed component is prevented from sensing pressure, corrosive gases and external stress, and
the slotted core is further configured to prevent the unexposed component from sensing external stress.

27. The sensing cable of claim 1, wherein the exposed component is a bare optical fiber.

28. The sensing cable of claim 1, wherein the exposed component is a coated optical fiber.

* * * * *